W. W. ANNABLE.
PNEUMATIC SPRING FOR VEHICLES.
APPLICATION FILED NOV. 10, 1906.
1,130,656.
Patented Mar. 2, 1915.
2 SHEETS—SHEET 1.
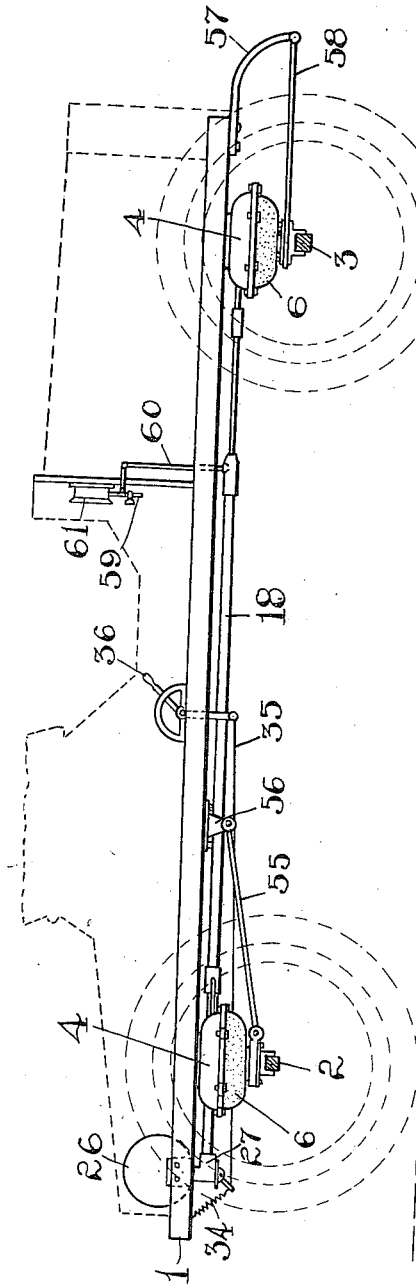
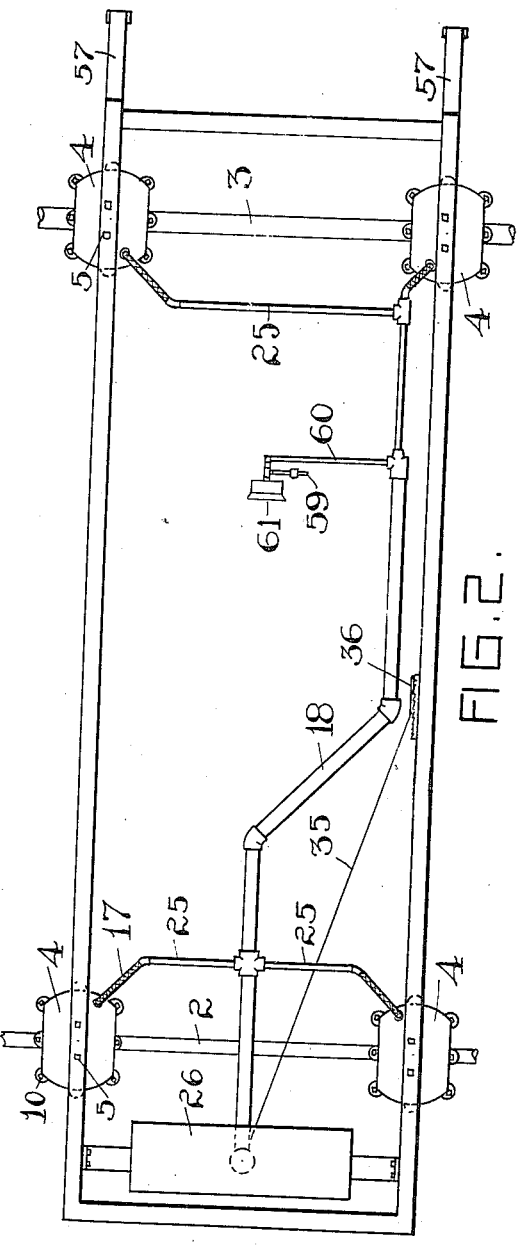
INVENTOR
WARREN W. ANNABLE.

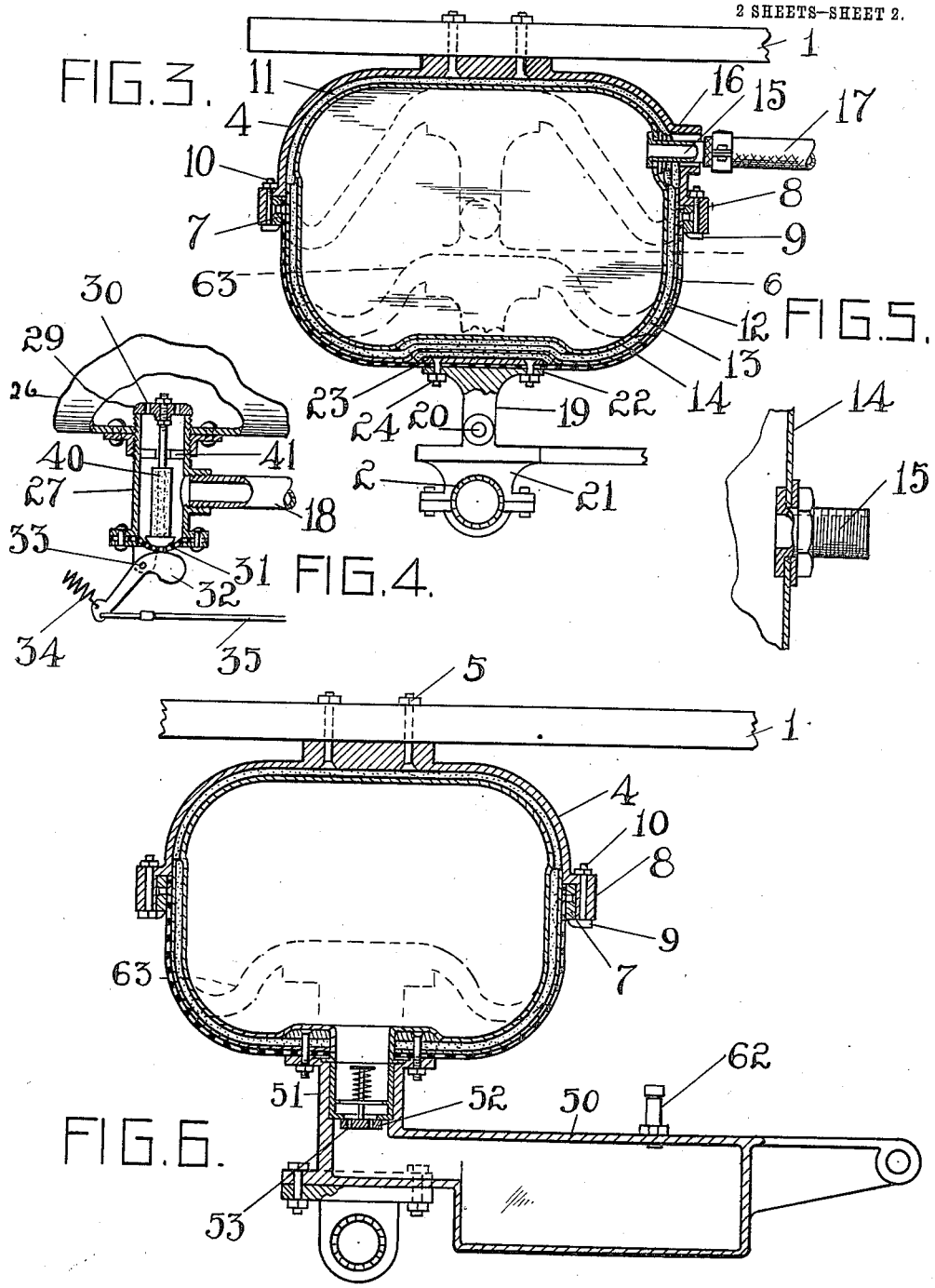

UNITED STATES PATENT OFFICE.

WARREN W. ANNABLE, OF GRAND RAPIDS, MICHIGAN, ASSIGNOR TO ANNABLE PNEUMATIC SPRING COMPANY, OF DETROIT, MICHIGAN, A CORPORATION OF MICHIGAN.

PNEUMATIC SPRING FOR VEHICLES.

1,130,656.   Specification of Letters Patent.   Patented Mar. 2, 1915.

Application filed November 10, 1906. Serial No. 342,881.

*To all whom it may concern:*

Be it known that I, WARREN W. ANNABLE, a citizen of the United States of America, residing at Grand Rapids, in the county of Kent and State of Michigan, have invented certain new and useful Improvements in Pneumatic Springs for Vehicles, of which the following is a specification, reference being had therein to the accompanying drawings.

The invention relates to a pneumatic spring support for vehicles, and consists in the construction of the pneumatic spring itself, the connection between a series of such springs, and the connection to a reservoir or air storage tank, with a free in-going connection and a restricted return.

More in detail, the invention comprises a pneumatic spring, or springs, placed between the running gear and the frame of a vehicle, the spring consisting of a rigid member and a flexible member, connected respectively to either the running gear or the frame, with an air chamber between the two members, which in turn is connected to a storage tank, with a check-valve or other device permitting a free flow of the air from the spring to the storage chamber but a more restricted or slower return of the air therefrom; also, in the construction of a vehicle with a series of these springs between the frame and the running gear which are inter-connected, so that the air may pass from one to the other, and also connected to a single tank, so that the air from all may pass into that tank freely, but with a restricted or slower return; also in means for varying the size of the return opening; and in the construction, arrangement and combination of the various parts, as more fully hereinafter described and particularly pointed out in the claims.

In the drawings,—Figure 1 is a side elevation of the frame of an automobile, showing my pneumatic spring applied thereto and showing in dotted lines the body; Fig. 2 is a top plan view of the frame, showing the springs and the air connections; Fig. 3 is a longitudinal section through one of the springs enlarged, showing the position of the parts in full lines when no load is placed on the spring, and in dotted lines in the normal position with the load thereon,—and also the extreme position to which the spring may be compressed; Fig. 4 is a section through the lower portion of a storage tank, and through the valve therein, illustrating the means for varying the size of the return-port; Fig. 5 is a section through a part of the air bag of the pneumatic spring, illustrating the manner of attaching the nipple thereto; Fig. 6 is a section similar to Fig. 3, showing a slightly modified form of arrangement of storage tank in which each spring may be supplied with its own tank, and showing in dotted lines the normal operating position of the parts.

1 represents the frame, and 2 and 3 the rear and front axles respectively, of an automobile or other vehicle. Between each axle, or any other suitable part of the running gear at the front and rear of the vehicle, I place two air springs, and as the construction of all the springs is alike a description of one will suffice for all.

4 is an inverted cup-shaped or bowl-shaped rigid member, which is preferably a casing, and this is supported centrally, as by the bolts 5, to the under side of the vehicle frame.

6 is a flexible diaphragm, preferably of leather, and preferably also dished or dish-shaped, as clearly shown in Figs. 3 and 6. This diaphragm is attached to a ring 7, which fits within the flange 8 at the lower edge of the rigid member 4, and is held therein by the heads 9 of the bolts 10.

The inner face of the rigid member 4 I preferably line with a felt lining 11. The inner face of the diaphragm 6 I preferably first cover with a cotton duck lining 12, cemented thereto, and over this I place a lining 13 of felt. Within the chamber thus formed between the flexible member and the rigid member I place an air bag 14, preferably of rubber, and having secured thereto at one point a nipple 15. The securing means may be by any suitable known devices, but I have shown the nipple 15 clamped around the edges of the aperture in the bag, as plainly shown in Fig. 5. This nipple 15 projects through a nipple 16 on the rigid casing, and is connected preferably by a flexible pipe 17 with the main pipe 18, which runs the length of the vehicle and is secured to the under side of the frame thereof. The connection to the diaphragm is in the center thereof, and the preferred form of connection is illustrated in Figs. 3 and 6, comprising a verticallyarranged bracket 19, pivoted at 20 to a casing 21 secured to the axle 2 or 3. At the upper end, the bracket 19 has an enlarged head or plate 22 resting on the outside of the flexible member 6, and a plate 23 within the flexible member, the two being bolted together by the bolts 24, so that in this way the bracket 19 is rigidly connected centrally of the flexible member or diaphragm.

The main pipe 18, as before described, extends longitudinally of the vehicle, so as to clear the operating parts of an automobile,—in case the vehicle is an automobile,—and is provided with suitable branch pipes 25 which lead to the various springs, as plainly shown in Fig. 2. This pipe also leads, at some suitable point to an air storage tank or reservoir 26. I have shown in Fig. 4 the pipe 18 leading into a valve casing 27, which projects up into the bottom of the tank and is controlled by a check-valve 29 opening inwardly, the check-valve having one or more restricted ports 30, so that there is always a restricted communication between the interior of the tank and the pipe 18,—and hence with the interior of the various springs. The lower end of the casing 27 is closed by a flexible closure 31, preferably of leather, and the check-valve at its lower end rests thereon.

32 is a cam lever pivoted at 33 and normally held out of contact with the flexible closure 31 by the spring 34. Connected to this cam lever is the operating rod 35, which leads to any suitable point in the vehicle, where it may be operated by a lever 36 (Fig. 1), so as to move the cam,—and hence open the check-valve, and hold it open to any desired degree. I have shown a rubber tube 40 sleeved about the stem of the check-valve, the upper end of which is adapted to strike the cross bar 41 so as to prevent the check-valve from opening too far, or being damaged in the operation of the device.

In Fig. 6 I have shown a construction similar to that already described, except instead of connecting the pneumatic springs to a common storage tank each spring is connected to a storage tank 50, which may be a hollow casting secured upon the axle, as shown, with a vertical nipple 51, in which is a check-valve 52, having the restricted ports 53 therethrough.

At suitable points I preferably apply distance rods to both the front and the rear axles, and I have shown the distance rods 55 connected to the rear axle and to brackets 56 on the side of the frame, and I have shown the downwardly and forwardly extending brackets 57 at the front of the vehicle, and the distance rods 58 extending from the front axle and pivoted thereto.

The parts being thus constructed and applied to a vehicle,—such as an automobile for instance,—I can pump into the air spring any desired pressure. In the construction shown in Figs. 1, 2 and 3, this may be done by simply pumping into the general system, and for this purpose I have shown the nipple 59 connected to a gage-pipe 60, to which I have shown attached a gage 61 on the dash board, so that the operator may know what pressure he has in the system, and also see what variations he is getting in the travel of the vehicle. In Fig. 6, where each spring has its own reservoir, each would have to be pumped up separately, and for that purpose I have shown the usual nipple connection 62 upon the reservoir shown therein. When the desired pressure is obtained in the various air springs, the weight of the vehicle will push in the flexible member, and it will stand when at rest substantially as shown by the dotted lines shown at 63 in Figs. 3 and 6. In this position of the parts, the check-valve 29 will be closed. If the vehicle is driven and strikes an obstacle, or has up-and-down vibration from any cause, the impact on the air springs will cause the flexible member to approach toward the rigid member, and thus force the air out of the spring and into the pipe, from whence it will be forced into the air tank, lifting the check-valve 29 so that the air will enter freely therein, but the minute the movement of the air ceases the check-valve will close, and the return of the air will be through the ports 30 at a much slower speed, so as to prevent any recoil of the springs.

It is desirable,—though not necessary, and it is also much more economical, in construction, to have the separate air springs connected together, and to a common tank provided with a check-valve, because it gives a larger body of air which is subject to the compression at one or more points, and makes the device more easy riding, giving a softer spring,—even for heavy loads, and also tends to hold the vehicle level. This is not essential, however, for each spring may have its own reservoir if desired.

I find in practice that with a device of this kind there is practically no recoil, and with a vehicle provided with solid tires,—preferably rubber,—it is as easy riding, or easier riding, than with a similar vehicle provided with pneumatic tires. I also find that by having a pneumatic spring,—one member of which is a flexible diaphragm, connected either to the frame or to the running gear, I get perfect elasticity, and there is practically no side motion to the vehicle, the rigidity of the leather diaphragm being quite sufficient to prevent such side motion, and yet allowing perfectly free up-and-down motion to take off the shocks of ordinary riding.

What I claim as my invention is,—

1. In an air spring for vehicles, the combination of a rigid cup-shaped member, a full flexible diaphragm secured to the edges thereof, a plate centrally secured to the diaphragm, connections from the plate to the frame and running gear respectively of the vehicle, such connections permitting the plate to assume varied angular relations to the cup-shaped member, an air bag between the two members, a storage receptacle, and means for allowing the air to pass freely from the air bag to the receptacle but compelling a more restricted return.

2. In a pneumatic spring for vehicles, a dished flexible diaphragm forming one wall of a compressed air chamber, a supporting plate secured centrally thereof, a pivotal connection between said plate and the vehicle, and a complementary-shaped opposing rigid wall against which the supporting plate is adapted to strike if the spring is collapsed.

3. In an air spring for vehicles, the combination of a pneumatic spring, a storage chamber, a connection between the chamber and spring permitting a free outflow of air from the spring to the chamber and a more restricted return, and manually operable means in said connection for varying the rapidity with which the air returns to the spring.

4. In an air spring for vehicles, the combination of a rigid member, a flexible diaphragm secured to the edges of said member, a plate centrally secured to the diaphragm, and a pivotal supporting connection rigidly attached to the diaphragm.

5. The combination with the frame and running gear of a vehicle, of an air spring therebetween, comprising a rigid member secured to one of said vehicle parts, a flexible diaphragm secured to said rigid member a plate centrally secured to the diaphragm, and a pivotal connection between said plate and the other of said vehicle parts.

6. In a vehicle spring system, a storage tank, a multiple of compressed air springs, a main pipe line leading from the storage tank, a plurality of branch lines connecting the main line with the air springs, a fitting connecting the storage tank with the main line, a valve within said fitting permitting a free flow of air to the storage chamber but compelling a more restricted return, and manually operable means for controlling said valve.

7. In an air spring for vehicles, the combination of a pneumatic spring, a storage chamber, a connection between the chamber and the spring permitting a free outflow of air from the spring to the chamber and a more restricted return, a manually operable lever, and means connecting said lever and said connection for actuating the latter by the lever.

8. In an air spring for vehicles, the combination of a pneumatic spring, a storage chamber, a valve between the chamber and spring permitting a free travel of air from the spring to the chamber and a more restricted return, a cam operating on said valve, and means for manually operating said cam.

In testimony whereof I affix my signature in presence of two witnesses.

WARREN W. ANNABLE.

Witnesses:
  AMELIA WILLIAMS,
  JAMES P. BARRY.